(12) United States Patent
Okura et al.

(10) Patent No.: US 7,807,272 B2
(45) Date of Patent: Oct. 5, 2010

(54) COATING SOLUTION, AND GAS BARRIER FILM, GAS BARRIER LAMINATE AND GAS BARRIER MULTILAYER FILM, USING THE COATING SOLUTION, AND THEIR MANUFACTURING METHODS

(75) Inventors: Masayuki Okura, Chuo-ku (JP); Yuko Sekimori, Omitama (JP); Masahiro Yamazaki, Omitama (JP)

(73) Assignee: Kureha Corporation, Tokyo (JP)

( * ) Notice: Subject to any disclaimer, the term of this patent is extended or adjusted under 35 U.S.C. 154(b) by 0 days.

(21) Appl. No.: 12/226,712

(22) PCT Filed: Apr. 6, 2007

(86) PCT No.: PCT/JP2007/057775

§ 371 (c)(1),
(2), (4) Date: Oct. 24, 2008

(87) PCT Pub. No.: WO2007/125741

PCT Pub. Date: Nov. 8, 2007

(65) Prior Publication Data

US 2009/0098399 A1 Apr. 16, 2009

(30) Foreign Application Priority Data

Apr. 26, 2006 (JP) .............................. 2006-121602

(51) Int. Cl.
B32B 27/06 (2006.01)
B32B 27/18 (2006.01)
B32B 27/30 (2006.01)
C08F 20/06 (2006.01)
C08F 6/00 (2006.01)

(52) U.S. Cl. ............... 428/522; 428/688; 524/401; 524/413; 524/430; 524/432; 525/329.7; 525/330.2; 526/317.1; 526/90; 526/108; 427/372.2; 427/384; 427/385.5; 427/393.5; 427/402; 427/407.1; 427/419.1; 427/419.8

(58) Field of Classification Search .......... None
See application file for complete search history.

(56) References Cited

U.S. PATENT DOCUMENTS

| | | | | |
|---|---|---|---|---|
| 3,959,237 A | * | 5/1976 | Blank | 525/330.2 |
| 4,868,051 A | * | 9/1989 | Grosjean | 428/336 |
| 6,114,021 A | * | 9/2000 | Pankratz et al. | 428/214 |
| 6,566,426 B1 | * | 5/2003 | Kanaida et al. | 524/96 |
| 7,501,176 B2 | * | 3/2009 | Yamasaki et al. | 428/220 |
| 7,569,267 B2 | * | 8/2009 | Tanaka et al. | 428/220 |
| 7,608,339 B2 | * | 10/2009 | Yamazaki et al. | 428/500 |
| 2005/0131162 A1 | * | 6/2005 | Tanaka et al. | 525/329.7 |
| 2007/0009693 A1 | * | 1/2007 | Inaba et al. | 428/35.7 |
| 2008/0090018 A1 | * | 4/2008 | Inaba et al. | 427/496 |
| 2009/0087676 A1 | * | 4/2009 | Okura et al. | 428/500 |

FOREIGN PATENT DOCUMENTS

| | | | |
|---|---|---|---|
| CN | 1911986 A | | 2/2007 |
| EP | 1 086 981 A1 | | 3/2001 |
| EP | 1 561 774 A1 | | 4/2003 |
| JP | 2004-315586 | | 4/2003 |
| JP | 2005-125693 | | 10/2003 |
| JP | 2005-125693 | * | 5/2005 |
| JP | 2006-062258 | * | 3/2006 |
| WO | WO 00/06619 | | 2/2000 |
| WO | WO 03/091317 A1 | | 4/2003 |

OTHER PUBLICATIONS

International Search Report of PCT/JP2007/057775 mailed Jul. 17, 2007.

* cited by examiner

*Primary Examiner*—Vivian Chen
(74) *Attorney, Agent, or Firm*—Reed Smith LLP

(57) ABSTRACT

A coating solution comprising:
a first solvent;
0.1 to 30 parts by weight of a polycarboxylic acid-based polymer relative to 100 parts by weight of the solvent; and
0.05 to 0.25 chemical equivalent of a zinc compound relative to an amount of carboxyl group in the polycarboxylic acid-based polymer, wherein
a number average molecular weight of the polycarboxylic acid-based polymer is in a range of 40,000 to 10,000,000.

9 Claims, No Drawings

COATING SOLUTION, AND GAS BARRIER FILM, GAS BARRIER LAMINATE AND GAS BARRIER MULTILAYER FILM, USING THE COATING SOLUTION, AND THEIR MANUFACTURING METHODS

TECHNICAL FIELD

The present invention relates to a gas barrier film, a gas barrier laminate and a gas barrier multilayer film useful as packaging materials of foods, beverages, chemicals, medicines and precision metal components such as electronic components, which tend to degrade due to the effect of oxygen or the like, and packaging materials of articles that need processing (heat sterilization), such as boiling and retort sterilization, under high-temperature hot water conditions, and relates to their manufacturing methods, as well as a coating solution used for their manufacturing methods.

BACKGROUND OF THE INVENTION

Conventionally, polymers that contain a high hydrogen bonding group with high hydrophilicity in their molecules, represented by poly(meth)acrylic acid and polyvinyl alcohol are used as gas barrier polymers. However, while exhibiting very excellent gas barrier properties against oxygen and the like under dry conditions, films made up of only any one of these polymers pose, under a high moisture conditions, problems that their gas barrier properties against oxygen and the like are greatly decreased due to their hydrophilicity, and that the films exhibit inferior resistance against humidity and hot water.

To solve these problems, for example, International Publication No. WO03/091317 (Document 1) discloses a film that uses a polycarboxylic acid-based polymer and a multivalent metal compound as starting materials and has a peak ratio (A1560/A1700) of the infrared absorption spectra of 0.25 or higher. The specification describes a technique involving forming a laminate in which a layer made of a polycarboxylic acid-based polymer and a layer made of a multivalent metal compound are adjacent to each other, and then crosslinking the polycarboxylic acid-based polymer with the multivalent metal.

In addition, as a technique related to the above-described technique, for example, Japanese Unexamined Patent Application Publication No. 2005-125693 (Document 2) discloses a gas barrier laminated film wherein a gas barrier layer made up of a crosslinking substance of a polycarboxylic acid and a multivalent metal compound is formed on at least one side of a film substrate. The specification describes that a substance in which a polycarboxylic acid is partially neutralized with an alkali such as sodium hydroxide, lithium hydroxide, potassium hydroxide, magnesium hydroxide, calcium hydroxide, barium hydroxide, aluminum hydroxide or ammonia is used as a polycarboxylic acid.

However, it has been found that the gas barrier films described in the above documents and the like, and a package using these films have a problem that their performances are decreased depending on manufacturing processes and applications. That is, whitening may occur or gas barrier properties or transparency may be damaged, in the case of exposure to cold water, for example, the case where an end face part of the film or the package comes into contact with cold water, or is contaminated with attachment of cold water or the case where the package is washed prior to heat sterilization or subjected to immersion treatment, in a process of manufacturing the film or the package.

DISCLOSURE OF THE INVENTION

In consideration of the problems that the above prior art has, the present invention is intended to provide a coating solution for obtaining a packaging material in which whitening can be sufficiently prevented, and also which is excellent in gas barrier properties and transparency, even when a packaging material is exposed to cold water of 30° C. or less, for example, in the case where the packaging material is used for a heat sterilization packaging application or the like. The present invention is also intended to provide a gas barrier film, a gas barrier laminate and a gas barrier multilayer film, using the coating solution, as well as their manufacturing methods.

As a result of intensive studies for accomplishing the above object, the present inventors discovered that, in a packaging material using a coating solution which contains a first solvent, 0.1 to 30 parts by weight of a polycarboxylic acid-based polymer relative to 100 parts by weight of the solvent, and 0.05 to 0.25 chemical equivalent of a zinc compound relative to an amount of carboxyl group in the polycarboxylic acid-based polymer, and in which the number average molecular weight of the above polycarboxylic acid-based polymer is in the range of 40,000 to 10,000,000, even in the case where the packaging material is exposed to cold water of 30° C. or lower (for example, exposed to cold water like the case where the end face parts of a film or a package come into contact with cold water, or are contaminated with attachment of cold water or the case where a package is washed prior to heat sterilization or subjected to immersion treatment), a packaging material in which whitening can be sufficiently prevented, and also which is excellent in gas barrier properties and transparency can be obtained, and thereby reaches the completion of the present invention.

A coating solution of the present invention contains a first solvent, 0.1 to 30 parts by weight of a polycarboxylic acid-based polymer relative to 100 parts by weight of the solvent, and 0.05 to 0.25 chemical equivalent of a zinc compound relative to an amount of carboxyl group in the polycarboxylic acid-based polymer, wherein the number average molecular weight of the above polycarboxylic acid-based polymer is in the range of 40,000 to 10,000,000.

A gas barrier film of the present invention comprises a layer (a) formed from a coating solution (A) which contains a first solvent, 0.1 to 30 parts by weight of a polycarboxylic acid-based polymer relative to 100 parts by weight of the solvent, and 0.05 to 0.25 chemical equivalent of a zinc compound relative to an amount of carboxyl group in the polycarboxylic acid-based polymer, and in which the number average molecular weight of the above polycarboxylic acid-based polymer is in the range of 40,000 to 10,000,000, and a support. The gas barrier film has the layer (a) formed from the coating solution (A) on at least one side of the support.

A gas barrier laminate of the present invention comprises a layer (a) formed from a coating solution (A) which contains a first solvent, 0.1 to 30 parts by weight of a polycarboxylic acid-based polymer relative to 100 parts by weight of the solvent, and 0.05 to 0.25 chemical equivalent of a zinc compound relative to an amount of carboxyl group in the polycarboxylic acid-based polymer, and in which the number average molecular weight of the above polycarboxylic acid-based polymer is in the range of 40,000 to 10,000,000, a layer (b) formed from a coating solution (B) containing the above multivalent metal compound and a second solvent and a support. The gas barrier laminate has, on at least one side of the support, at least one lamination unit in which the layer (a) formed from the coating solution (A) and the layer (b) formed from the coating solution (B) are adjacent to each other.

Additionally, the gas barrier multilayer film of the present invention comprises the above gas barrier laminate and a plastic film laminated on at least one side of the above gas barrier laminate.

Moreover, the packaging material of the present invention comprises the above gas barrier laminate.

Furthermore, the package of the present invention comprises the above gas barrier laminate.

A method of manufacturing a gas barrier film of the present invention is a method that entails applying, to at least one side of a support, a coating solution (A) which contains a first solvent, 0.1 to 30 parts by weight of a polycarboxylic acid-based polymer relative to 100 parts by weight of the solvent, and 0.05 to 0.25 chemical equivalent of a zinc compound relative to an amount of carboxyl group in the polycarboxylic acid-based polymer, and in which the number average molecular weight of the above polycarboxylic acid-based polymer is in the range of 40,000 to 10,000,000, followed by drying to obtain a gas barrier film that has the layer (a) formed from the coating solution (A).

A method of manufacturing a gas barrier laminate of the present invention is a method that entails applying, to at least one side of a support, a coating solution (A) which contains a first solvent, 0.1 to 30 parts by weight of a polycarboxylic acid-based polymer relative to 100 parts by weight of the solvent, and 0.05 to 0.25 chemical equivalent of a zinc compound relative to an amount of carboxyl group in the polycarboxylic acid-based polymer, and in which the number average molecular weight of the above polycarboxylic acid-based polymer is in the range of 40,000 to 10,000,000 and a coating solution (B) containing the above multivalent metal compound and a second solvent, followed by drying to obtain a gas barrier laminate having at least one lamination unit in which the layer (a) formed from the coating solution (A) and the layer (b) formed from the coating solution (B) are adjacent to each other.

A method of manufacturing a gas barrier multilayer film of the present invention is a method that entails applying, to at least one side of a support, a coating solution (A) which contains a first solvent, 0.1 to 30 parts by weight of a polycarboxylic acid-based polymer relative to 100 parts by weight of the solvent, and 0.05 to 0.25 chemical equivalent of a zinc compound relative to an amount of carboxyl group in the polycarboxylic acid-based polymer, and in which the number average molecular weight of the above polycarboxylic acid-based polymer is in the range of 40,000 to 10,000,000 and a coating solution (B) which contains the above multivalent metal compound and the above second solvent, followed by drying to obtain a gas barrier laminate, and then laminating a plastic film on at least one side of the above barrier laminate to obtain a gas barrier multilayer film.

Here, as for a packaging material using a coating solution of the present invention, it is not known exactly why a packaging material in which whitening can be sufficiently prevented, and also which is excellent in gas barrier properties and transparency, even when the packaging material is exposed to cold water of 30° C. or less. However, the present inventors speculate as follows.

That is, when the packaging material is exposed to water, swelling of a polycarboxylic acid-based polymer and crosslinking caused by a multivalent metal compound progress at the same time. When a packaging material is exposed to cold water, the progress of crosslinking caused by the multivalent metal compound in a layer made up of the polycarboxylic acid-based polymer is slow as compared with the case where, for example, the packaging material is exposed to warm water of 70° C. or higher. Hence, the swelling of the polycarboxylic acid-based polymer preferentially happens. When the crosslinking caused by the multivalent metal compound in the polycarboxylic acid-based polymer layer is effected after the swelling of the polycarboxylic acid-based polymer preferentially progresses due to the moisture that intrudes to the layer made up of the polycarboxylic acid-based polymer, a uniform layer cannot be kept because of the influence of moisture in the polycarboxylic acid-based polymer layer. The present inventors speculate that whitening occurs or gas barrier properties and the transparency are damaged as a result of the above factors. Then, the present inventors speculate as follows. In a packaging material that uses a coating solution of the present invention, the crosslinking caused by the multivalent metal compound in the polycarboxylic acid layer before the packaging material is exposed to cold water progresses sufficiently and water resistance of the polycarboxylic acid-based polymer layer is improved. Therefore, it is possible to obtain a packaging material in which whitening can be sufficiently prevented, and also which is excellent in gas barrier properties and transparency.

The present invention makes it possible to provide a coating solution for obtaining a packaging material in which whitening can be sufficiently prevented, and also which is excellent in gas barrier properties and transparency, even when the material is exposed to cold water of 30° C., for example, in the case where the packaging material is used for a heat sterilization packaging application or the like. The present invention also makes it possible to provide a gas barrier film, a gas barrier laminate, and a gas barrier multilayer film, using the coating solution, as well as their manufacturing methods.

DETAILED DESCRIPTION OF THE PREFERRED EMBODIMENTS

Hereinafter, the present invention will be described in detail by means of preferred embodiments.

<Coating Solution (A)>

First, a coating solution of the present invention will be described. A coating solution (A) of the present invention contains a solvent, 0.1 to 30 parts by weight of a polycarboxylic acid-based polymer relative to 100 parts by weight of the solvent and 0.05 to 0.25 chemical equivalent of a zinc compound relative to the amount of the carboxyl group in the polycarboxylic acid-based polymer, wherein the number average molecular weight of the above polycarboxylic acid-based polymer is in the range of 40,000 to 10,000,000.

(First Solvent)

A first solvent related to the present invention is a medium for a polycarboxylic acid-based polymer described below and an alkali metal compound described below and a multivalent metal compound. Such first solvents include, for example, water, methyl alcohol, ethyl alcohol, isopropyl alcohol, n-propyl alcohol, n-butyl alcohol, n-pentyl alcohol, dimethylsulfoxide, dimethylformamide, dimethylacetamide, toluene, hexane, heptane, cyclohexane, acetone, methyl ethyl ketone, diethyl ether, dioxane, tetrahydrofuran, ethyl acetate and butyl acetate. Of these, from the viewpoint of the environment, water, methyl alcohol, ethyl alcohol, and isopropyl alcohol are preferable. In addition, from the viewpoint of solubility of a polycarboxylic acid-based polymer and a multivalent metal compound, water is preferred. Additionally, these first solvents may be used alone or in a mixture of two or more species.

(Polycarboxylic Acid-Based Polymer)

A polycarboxylic acid-based polymer related to the present invention is produced by polymerization of a polycarboxylic acid-based polymerizable monomer and is a polymer having two or more carboxyl groups in its molecule. Such polycarboxylic acid-based polymers include, for example, (co)polymers of $\alpha,\beta$-monoethylenically unsaturated carboxylic acids; copolymers of $\alpha,\beta$-monoethylenically unsaturated carboxylic acids and other ethylenically unsaturated monomers; acidic polysaccharides such as alginic acid, carboxymethylcellulose, and the pectin that have carboxyl groups in their molecules. These polycarboxylic acid-based polymers may be used alone or in a mixture of two or more species.

In addition, such $\alpha,\beta$-monoethylenically unsaturated carboxylic acids include, for example, acrylic acid, methacrylic acid, itaconic acid, maleic acid, fumaric acid and crotonic acid. Additionally, ethylenically unsaturated monomers that are copolymerizable with those $\alpha,\beta$-monoethylenically unsaturated carboxylic acids include, for example, ethylene, propylene, vinyl carboxylates of saturated carboxylic acids such as vinyl acetate and the like, alkyl acrylates, alkyl methacrylates, alkyl itaconates, vinyl chloride, vinylidene chloride, styrene, acrylamides and acrylonitrile.

Among such polycarboxylic acid-based polymers, from the viewpoints of gas barrier properties of a resulting gas barrier film, gas barrier laminate and gas barrier multilayer film, a (co)polymer of at least one polymerizable monomer selected from the group consisting of acrylic acid, methacrylic acid, itaconic acid, maleic acid, fumaric acid, and crotonic acid and a mixture thereof are preferably used. A (co)polymer of at least one polymerizable monomer selected from the group consisting of acrylic acid, methacrylic acid and maleic acid and a mixture thereof are more preferably used. Polyacrylic acid, polymethacrylic acid, polymaleic acid, and a mixture thereof are particularly preferably used.

Additionally, in a polycarboxylic acid-based polymer, from the viewpoints of gas barrier properties of a film and stability to a high-temperature water vapor and hot water, the oxygen permeation coefficient of a film molded only from a polycarboxylic acid-based polymer, which is to be a raw material, at a temperature of 30° C. and a relative humidity of 0% is preferably 1000 cm$^3$ (STP)·μm/m$^2$·day·MPa or less for use, more preferably 500 Cm$^3$ (STP)·μm/m$^2$·day·MPa or less for use, particularly preferably 100 cm$^3$ (STP)·μm/m$^2$·day·MPa or less, most preferably 70 cm$^3$ (STP)·μm/m$^2$·day·MPa or less for use. Moreover, the oxygen permeation coefficient at a temperature of 30° C. and a relative humidity of 0% can be calculated by multiplying a measurement of a oxygen permeability coefficient at a temperature of 30° C. and a relative humidity of 0% [unit: cm$^3$ (STP)·μm/m$^2$·day·MPa] by the thickness of a film (unit: μm).

In the coating solution (A) of the present invention, the number average molecular weight (Mn) measured by the GPC method of such a polycarboxylic acid-based polymer needs to be in the range of 40,000 to 10,000,000. If the number average molecular weight is less than 40,000, the resulting gas barrier film cannot have sufficient water resistance. In addition, it is not possible to obtain a packaging material which has gas barrier properties and transparency sufficiently prevented from deteriorating, and in which whitening is prevented. On the other hand, if the number average molecular weight exceeds 10,000,000, the viscosity of the coating solution is high, thereby losing coating suitability. Furthermore, from the viewpoint of water resistance of the resulting gas barrier film, the number average molecular weight of such a polycarboxylic acid-based polymer is preferably in the range of 70,000 to 5,000,000, more preferably in the range of 100,000 to 3,000,000, particularly preferably in the range of 150,000 to 2,000,000. In addition, polycarboxylic acid-based polymers with different number average molecular weights may be blended and used in predetermined amounts.

Moreover, in the coating solution (A) of the present invention, the content of such a polycarboxylic acid-based polymer needs to be in the range of 0.1 to 30 parts by weight relative to 100 parts by weight of the above solvent. If the content is less than 0.1 parts by weight, the resulting gas barrier film cannot have sufficient gas barrier properties. On the other hand, if the content exceeds 30 parts by weight, the coating solution is unstable, thereby being incapable of obtaining a uniform film. Furthermore, from the viewpoints of stability and the coating suitability of a coating solution, the content of such a polycarboxylic acid-based polymer is preferably in the range of 0.5 to 20 parts by weight, more preferably in the range of 1 to 10 parts by weight, relative to 100 parts by weight of the above solvent.

(Zinc Compound)

A zinc compound related to the present invention refers to an oxide, a hydroxide, a carbonate salt, an organic acid salt or an inorganic acid salt of zinc in addition to zinc metal. Such organic acid salts include, for example, formate salts, acetate salts, oxalate salts, citrate salts and lactate salts. In addition, such inorganic acid salts include, for example, chlorides, sulfate salts, nitrate salts and phosphate salts.

Among these zinc compounds, from the viewpoints of gas barrier properties of a resulting gas barrier film, gas barrier laminate, and a gas barrier multilayer film and the stability of a coating solution (solubility of a zinc compound), zinc metal, a zinc oxide, a zinc hydroxide and a zinc carbonate are preferably used.

Although the forms of these zinc compounds may be particulate or non-particulate, particulate forms are preferred from the viewpoint of solubility. In addition, although the average particle diameter of such a particle is not particularly limited, from the viewpoint of solubility, the average particle diameter is preferably 50 μm or less, more preferably 30 μm or less, particularly preferably 10 μm or less.

In addition, in the coating solution (A) of the present invention, the content of such a zinc compound needs to be in the range of 0.05 to 0.25 chemical equivalent relative to the amount of the carboxyl group in the above polycarboxylic acid-based polymer. If the content is less than 0.05 chemical equivalent, a resulting gas barrier film does not have sufficient water resistance and it is not possible to obtain a packaging material which has gas barrier properties and transparency sufficiently prevented from deteriorating, and in which whitening is prevented. On the other hand, if the content exceeds 0.25 chemical equivalent, the coating solution becomes unstable, so that a uniform film cannot be obtained. Furthermore, from the viewpoints of the stability of a coating solution and water resistance of a resulting gas barrier film, the content of such a zinc compound is preferably in the range of 0.07 to 0.25 chemical equivalent, more preferably in the range of 0.1 to 0.25 chemical equivalent, relative to the amount of the carboxyl group in the above polycarboxylic acid-based polymer.

(Coating Solution (A))

In the coating solution (A) of the present invention, additives such as other polymers, softening agents, stabilizers, anti-blocking agents, adhesive agents, inorganic layered compounds, represented by montmorillonite and the like, can be added as appropriate, besides the solvent, the polycarboxylic acid-based polymer, the alkali metal compound and the multivalent metal compound, described above, within the range where the gas barrier properties of the resulting gas barrier film, gas barrier laminate and gas barrier multilayer film are not damaged. When such additives are used, the content of additive is preferably in the range of 0.1 to 100 parts by weight relative to 100 parts by weight of the above polycarboxylic acid-based polymer.

<Gas Barrier Film and Gas Barrier Laminate and Gas Barrier Multilayer Film>

Next, a gas barrier film, a gas barrier laminate, and a gas barrier multilayer film of the present invention will be described. A gas barrier film of the present invention comprises a layer (a) formed from the above-mentioned coating solution (A) and a support described below and has the layer (a) formed from the above coating solution (A) on at least one side of the above support. In addition, a gas barrier laminate of the present invention comprises the layer (a) formed from the above-mentioned coating solution (A), a layer (B) formed from a coating solution (B) described below and a support described below. The gas barrier laminate has, on at least one side of the support, at least one lamination unit in which the layer (a) formed from the coating solution (A) and the layer (b) formed from the coating solution (B) are paired so as to be mutually adjacent.

(Support)

A support related to the present invention is a support for sequentially laminating the layer (a) formed from the above-mentioned coating solution (A) and the layer (a) formed from the coating solution (B) described below. The form of such a support is not particularly limited, and the examples include the forms of a film, a sheet, and containers such as bottles, cups and trays.

In addition, the materials of such a support include, for example, metals, glasses, papers and plastics (including metal deposited plastics). Additionally, the materials of plastics of these materials include, for example, polyolefin-based polymers such as low density polyethylene, high density polyethylene, linear low density polyethylene, polypropylene, poly (4-methyl pentene) and cyclic polyolefin and their copolymers and acid modified substances of the polymers and copolymers; vinyl acetate-based copolymers such as polyvinyl acetate, ethylene-vinyl acetate copolymers, saponified substances of ethylene-vinyl acetate copolymers and polyvinyl alcohol; polyester-based polymers such as polyethylene terephthalate, polybutylene terephthalate, poly($\epsilon$-caprolactone), polyhydroxybutyrate and polyhydroxyvalirate and their copolymers; polyamide-based polymers such as nylon 6, nylon 66, nylon 12, nylon 6, 66 copolymers, nylon 6, 12 copolymers and meta-xyleneadipamide-nylon 6 copolymers and their copolymers; polyether-based polymers such as polyethylene glycol, polyethersulfone, polyphenylene sulfides and polyphenylene oxides; chlorine-containing and fluorine-containing polymers such as polyvinyl chloride, polyvinylidene chloride, polyvinyl fluoride and polyvinylidene fluoride and their copolymers; acrylic-based polymers such as polymethyl acrylate, polyethyl acrylate, polymethyl methacrylate, polyethyl methacrylate and polyacrylonitrile and their copolymers; polyimide-based polymers and their copolymers; resins such as alkyd resin, melamine resin, acryl resin, nitrocellulose, urethane resin, unsaturated polyester resin, phenol resin, amino resin, fluoro resin and epoxy resin used for paints; and natural polymer compounds such as cellulose, starch, pullulan, chitin, chitosan, glucomannan, agarose and gelatin.

In addition, as for such supports, from the viewpoint of modifying the adhesion to the layer (a) formed from the above-mentioned coating solution (A) or the layer (b) formed from the coating solution (B) described below, a material in which the surface of a support may be activated by being subjected to corona treatment, flame treatment, plasma treatment and the like may be used, or a material in which an adhesive layer is disposed on the surface of a support may be used. A resin used for such an adhesive layer is not particularly limited so long as the resin is used for a dry laminate, an anchor coat and a primer, and the examples that can be used include alkyd resin, melamine resin, acryl resin, nitrocellulose, urethane resin, polyester resin, phenol resin, amino resin, fluoro resin and epoxy resin.

(Coating Solution (B))

The coating solution (B) related to the present invention contains a multivalent metal compound, and a second solvent. Then, such a multivalent metal compound refers to a simple substance of a multivalent metal atom, whose metal ion has a valence of two or more and refers to a compound thereof.

Such multivalent metals include, for example, alkaline earth metals such as beryllium, magnesium and calcium; transition metals such as titanium, zirconium, chromium, manganese, iron, cobalt, nickel, copper, and zinc; and aluminum. In addition, such multivalent metal compounds include, for example, oxides, hydroxides, carbonate salts, organic acid salts or inorganic acid salts, of the above multivalent metals; ammonium complexes or the secondary to quaternary amine complexes, of the above multivalent metals, or their carbonate salts or organic acid salts; and alkyl alkoxides of the above multivalent metals.

Of these multivalent metal compounds, from the viewpoints of gas barrier properties, resistance to high temperature water vapors and hot water and manufacturability, divalent metal compounds are preferable, alkaline earth metals, oxides, hydroxides or carbonates of cobalt, nickel, copper or zinc; ammonium complex of cobalt, nickel, copper or zinc or their carbonates are more preferable, oxides, hydroxides or carbonates of magnesium, calcium, copper or zinc; ammonium complexes of copper or zinc, or their carbonates are particularly preferable.

In addition, the form of such a multivalent metal compound is preferably particulate. In such a multivalent metal compound, from the viewpoints of gas barrier properties and coating suitability, the average particle diameter of the particle is preferably 5 μm or less, more preferably 1 μm or less, particularly preferably 0.1 μm or less.

The second solvent related to the present invention include, for example, water, methyl alcohol, ethyl alcohol, isopropyl alcohol, n-propyl alcohol, n-butyl alcohol, n-pentyl alcohol, dimethylsulfoxide, dimethylformamide, dimethylacetamide, toluene, hexane, heptane, cyclohexane, acetone, methyl ethyl ketone, diethyl ether, dioxane, tetrahydrofuran, ethyl acetate and butyl acetate. Of these, from the viewpoint of the coating properties, methyl alcohol, ethyl alcohol, isopropyl alcohol, toluene and ethyl acetate are preferable. In addition, from the viewpoint of manufacturability, methyl alcohol, ethyl alcohol, isopropyl alcohol and water are preferable. Additionally, a gas barrier film of the present invention is excellent in water resistance, and thus water can be used as the second solvent. Moreover, these second solvents may be used alone in a single species or in a mixture of two or more species.

In the coating solution (B) related to the present invention, additives such as a resin, a dispersing agent, a surfactant, a softening agent, a stabilizer, a membrane forming agent, an anti-blocking agent and a adhesive agents can be added as appropriate.

In this coating solution (B), a resin soluble or dispersible in a used solvent system is preferably mixed and used in order to improve coating suitability and film producing properties. The resins soluble or dispersible in the solvent system used in this manner include, for example, resins used for paints such as alkyd resins, melamine resins, acryl resins, nitrocellulose, urethane resins, polyester resins, phenol resins, amino resins, fluoro resins and epoxy resins.

Moreover, in this coating solution (B), a dispersing agent soluble or dispersible in a used solvent system is preferably mixed and used in order to improve the dispersibility of a multivalent metal compound. The dispersing agents soluble or dispersible in a solvent system used in this manner include, for example, substances such as acrylamide, acrylic acid, acrylic esters, neutralized acrylic acid, acrylonitrile, adipic acid, adipate ester, neutralized adipic acid, azelaic acid, abietic acid, aminododecanoic acid, arachidic acid, allylamine, arginine, arginine acid, alubumin, ammonia, itaconic acid, itaconate ester, neutralized itaconic acid, ethylene oxide, ethylene glycol, ethylenediamine, oleic acid, kaolin, casein, caprylic acid, caprolactam, xanthan gum, citric acid, glycine, cristobalite, glycerin, glycerin ester, glucose, crotonic acid, silicic acid, saccharose, salicylic acid, cycloheptene, oxalic acid, starch, stearic acid, sebacic acid, cellulose, ceresin, sorbitan oleate, sorbitan stearate, sorbitan palmitate, sorbitan behenate, sorbitan laurate, sorbitol, sorbic acid, talc, dextrine, terephthalic acid, dolomite, nitrocellulose, urea, vermiculite, palmitic acid, pinene, phthalic acid, fumaric acid, propionic acid, propylene glycol, hexamethylenediamine, pectin, behenic acid, benzyl alcohol, benzoin acid, benzoin acid ester, benzoguanamine, pentaerythritol, bentonite, boric acid, polydimethylsiloxane, polyvinyl alcohol, mica, maleic acid, maleate ester, neutralized maleic acid, malonic acid, mannitol, myristic acid, methacrylic acid, methylcellulose, palm oil, eugenol, butyric acid, lignocellulose, lysine, malic acid, phosphoric acid, lecithin, rosin and wax, or polymers or copolymers of these substances.

In addition, in the coating solution (B) related to the present invention, from the viewpoint of coating suitability, the percentage content of the multivalent metal compound and the additive of coating solution (B) in the coating solution (B) is preferably in the range of 1 to 50% by weight, more preferably in the range of 3 to 45% by weight, particularly preferably in the range of 5 to 40% by weight, relative to the total weight of the coating solution (B).

(Gas Barrier Film)

A gas barrier film of the present invention comprises the layer (a) formed from the above-mentioned coating solution (A) and the above-mentioned support, and has the layer (a) formed from the above coating solution (A) on at least one side of the above support.

In such a gas barrier film, from the viewpoints of gas barrier properties and productivity, the thickness of the layer (a) formed from the above coating solution (A) is preferably in the range of 0.01 to 10 µm, more preferably in the range of 0.05 to 5 µm, and particularly preferably in the range of 0.05 to 1 µm. In addition, in this gas barrier film, the oxygen permeability at a temperature of 30° C. and a relative humidity of 0% is preferably 1000 cm$^3$ (STP)/m$^2$·day·MPa or less, more preferably 500 Cm$^3$ (STP)/m$^2$·day·MPa or less, particularly preferably 100 cm$^3$ (STP)/m$^2$·day·MPa or less, most preferably 70 cm$^3$ (STP)/m$^2$·day·MPa or less. Moreover, in the layer (a) formed from the coating solution (A) obtained by removal of the above support from such a gas barrier film, the oxygen permeability at a temperature of 30° C. and a relative humidity of 0% is preferably 1000 cm$^3$ (STP)/m$^2$·day·MPa or less, more preferably 500 cm$^3$ (STP)/m$^2$·day·MPa or less, particularly preferably 100 cm$^3$ (STP)/m$^2$·day·MPa or less, most preferably 70 cm$^3$ (STP)/m$^2$·day·MPa or less.

(Gas Barrier Laminate)

A gas barrier laminate of the present invention comprises the layer (a) formed from the above-mentioned coating solution (A) and the layer (B) formed from the coating solution (B) described above and the above-described support, the gas barrier laminate having, on at least one side of the support, at least one lamination unit in which the layer (a) formed from the coating solution (A) and the layer (b) formed from the coating solution (B) are adjacent to each other.

In such a gas barrier laminate, from the viewpoints of gas barrier properties and productivity, the thickness of the layer (a) formed from the above coating solution (A) is preferably in the range of 0.01 to 10 µm, more preferably in the range of 0.05 to 5 µm, particularly preferably in the range of 0.05 to 1 µm. In addition, in such a gas barrier laminate, from the viewpoints of gas barrier properties and productivity, the thickness of the layer (b) formed from the above coating solution (B) is preferably in the range of 0.01 to 10 µm, more preferably in the range of 0.05 to 5 µm, particularly preferably in the range of 0.05 to 1 µm. Additionally, the laminate aspects of the layer (a) formed from the above coating solution (A) and the layer (b) formed from the above coating solution (B) of the present invention include an aspect of, for example, (a)/(b), (b)/(a), (a)/(b)/(a) and (b)/(a)/(b) laminated in the order from one side of the above support.

In addition, in this gas barrier laminate, the oxygen permeability at a temperature of 30° C. and a relative humidity of 0% is preferably 1000 cm$^3$ (STP)/m$^2$·day·MPa or less, more preferably 500 cm$^3$ (STP)/m$^2$·day·MPa or less, particularly preferably 100 cm$^3$ (STP)/m$^2$·day·MPa or less, most preferably 70 cm$^3$ (STP)/m$^2$·day·MPa or less.

In addition, a material comprising such a gas barrier laminate can be suitably used as a packaging material for foods, beverages, chemicals, medicines and precision metal components such as electronic components that are subject to deterioration by influence of oxygen or the like, as a packaging material for articles that need processing (heat sterilization) such as boiling and retort sterilization, under high-temperature hot water conditions or their packages. Additionally, for example, in the case where a packaging material is used for a heat sterilization packaging application or the like, even if a packaging material is exposed to cold water of 30° C. or less, in such a packaging material, whitening can be sufficiently prevented, and also which is excellent in gas barrier properties and transparency. Thus such a packaging material can be suitably used particularly as a packaging material for a heat sterilization packaging application.

(Gas Barrier Multilayer Film)

The gas barrier multilayer film of the present invention comprises the above-described gas barrier laminate and a plastic film laminated on at least one side of the above gas barrier laminate.

Such a plastic film can be selected as appropriate depending on the object of strength impartment, seal performance impartment and open-easiness impartment during sealing, design impartment, light shielding impartment, moisture resistance impartment, or the like, and is not particularly limited. The examples can include films of materials similar to the materials of plastics in the above-described support. In addition, such plastic films may be used alone in a single species or in a laminate of two or more species. Additionally, the thickness of this plastic film is preferably from 1 to 1000 µm, more preferably from 5 to 500 µm, particularly preferably from 5 to 200 µm, most preferably from 5 to 150 µm.

In such a gas barrier multilayer film, the oxygen permeability at a temperature of 30° C. and a relative humidity of 0% is preferably 1000 cm$^3$ (STP)/m$^2$·day·MPa or less, more preferably 500 cm³ (STP)/m²·day·MPa or less, particularly preferably 100 cm³ (STP)/m²·day·MPa or less, most preferably 70 cm³ (STP)/m²·day·MPa or less.

Additionally, in such a gas barrier multilayer film, from the viewpoint of the storability of contents, the oxygen permeability at a temperature of 30° C. and under a high moisture condition of a relative humidity of 80% is preferably 100 cm³ (STP)/m²·day·MPa or less, more preferably 70 cm³ (STP)/m²·day·MPa or less, particularly preferably 50 cm³ (STP)/m²·day·MPa or less.

Though the laminate aspect of a plastic film in such a gas barrier multilayer film is not particularly limited, from the viewpoint of handling as a product, preferred laminate aspects include polyethylene terephthalate/layer (a)/layer (b)/polyolefin, nylon/layer (a)/layer (b)/polyolefin, polypropylene/layer (a)/layer (b)/polyolefin, paper/layer (a)/layer (b)/polyolefin, polyethylene terephthalate/layer (a)/layer (b)/layer (a)/polyolefin, polyethylene terephthalate/layer (a)/layer (b)/nylon/polyolefin and polyethylene terephthalate/layer (a)/layer (b)/metal deposited nylon/polyolefin. Of these, polyethylene terephthalate/layer (a)/layer (b)/polyolefin, polyethylene terephthalate/layer (a)/layer (b)/nylon/polyolefin, polyethylene terephthalate/layer (a)/layer (b)/metal deposited nylon/polyolefin are more preferred and polyethylene terephthalate/layer (a)/layer (b)/polyolefin and polyethylene terephthalate/layer (a)/layer (b)/nylon/polyolefin are particularly preferred.

<Manufacturing Method of Gas Barrier Film, Gas Barrier Laminate and Gas Barrier Multilayer Film>

Next, methods of manufacturing a gas barrier film, a gas barrier laminate, and a gas barrier multilayer film of the present invention will be described.

(Method of Manufacturing Gas Barrier Film)

The method of manufacturing a gas barrier film of the present invention is a method of applying the above-described coating solution (A) to at least one side of the above-described support and then drying the solution to obtain a gas barrier film having the layer (a) formed from the above coating solution (A).

The method of applying the above coating solution (A) is not particularly limited and the examples include a method of application by means of a reverse roll coating machine such as an air knife coater, a direct gravure coater, a gravure offset, an arc gravure coater, a top feeding reverse coater, a bottom feeding reverse coater, or a nozzle feeding reverse coater; or a five roll coater, a lip coater, a barcoater, bar reverse coater or a die coater.

In addition, the method of drying the above coating solution (A) is not particularly limited, and the methods can include a method by natural drying, a method of drying in an oven set to a predetermined temperature, and a method using a dryer with a coater, for example, an arch drier, a floating dryer, a drum drier, an infrared ray drier, or the like. Additionally, the drying conditions can be selected as appropriate depending on a method of drying. For example, in a method of drying in an oven, the drying temperature is preferably from 40 to 350° C., more preferably from 45 to 325° C., particularly preferably from 50 to 300° C. Moreover, the drying time is preferably from 0.5 sec to 10 min, more preferably from 1 sec to 5 min, particularly preferably from 1 sec to 1 min.

(Method of Manufacturing Gas Barrier Laminate)

A method of manufacturing a gas barrier laminate of the present invention is a method that entails applying the above-described coating solution (A) and the above described coating solution (B) to at least one side of the above-described support and drying the resulting material to thereby obtain a gas barrier laminate having, on at least one side of the support, at least one lamination unit in which the layer (a) formed from the coating solution (A) and the layer (b) formed from the coating solution (B) are adjacent to each other.

The method of applying the above coating solution (A) and the method of drying the above coating solution (A) can include the methods as described above. In addition the methods of applying and drying the above coating solution (B) can include the vapor phase coating processes such as a vapor-deposition method, a sputtering method, and an ion plating method, in addition to methods similar to the methods of applying and drying the above-described coating solution (A) in the above-described method of manufacturing a gas barrier film.

Furthermore, the order of applying the above coating solution (A) and the above coating solution (B) may be an order in which the above coating solution (A) is applied to at least one side of the above support and dried, and then the above coating solution (B) is applied and dried or may be an order in which the above coating solution (B) is applied to at least one side of the above support and dried, and then the above coating solution (A) is applied and dried.

(Method of Manufacturing Gas Barrier Multilayer Film)

The method of manufacturing a gas barrier multilayer film of the present invention is a method of laminating a plastic film to at least one side of a gas barrier laminate as described above to thereby obtain the above-described gas barrier multilayer film.

A method of laminating a plastic film in such a way can be selected as appropriate from well-known laminating methods and is not particularly limited. The examples include a dry laminating method, a wet laminating method and an extruding laminating method.

EXAMPLE

The present invention will be described more specifically on the basis of Examples and Comparative Examples hereinafter; however, the invention is by no means limited to the Examples below. In addition, the oxygen permeability coefficient of a polycarboxylic acid-based polymer used as a raw material was measured by the following method.

<Measurement of Oxygen Permeability Coefficient of Polycarboxylic Acid-Based Polymer Used as Raw Material>

A solution of 5 parts by weight of polyacrylic acid (polycarboxylic acid-based polymer) diluted with 100 parts by weight of water was applied to a corona-treated side of a biaxially oriented polyester film (support) having a thickness of 12 μm using a mayer bar and then the resulting material was dried at 90° C. for 30 seconds. The material as a film sample was measured to obtain an oxygen permeability coefficient. In other words, the oxygen permeability of the film sample was measured using an oxygen permeation tester (OX-TRAN2/20: available from MOCON Inc.) at a temperature of 30° C. and a relative humidity (RH) of 0% on the both sides. Then, the measurement of the resulting oxygen permeability (unit: cm³ (STP)/m²·day·MPa) was multiplied by the thickness of a polyacrylic acid layer (unit: μm) to calculate the oxygen permeability coefficient (unit: cm³ (STP)·μm/m²·day·MPa).

COATING SOLUTION

(i) Preparation of Coating Solution

Example 1

5 Parts by weight of polyacrylic acid (available from Toagosei Co., Ltd., Aron A-10H, Mn: 200,000, oxygen permeability coefficient: 50 cm$^3$ (STP)·μm/m$^2$·day·MPa) was diluted with 100 parts by weight of water. Thereafter, 0.15 chemical equivalent of zinc oxide (particulate, particle size: 5 μm) relative to the amount of the carboxyl group of polyacrylic acid was added thereto and then the resulting material was agitated at room temperature for two days to prepare a coating solution (A).

Example 2

A coating solution (A) was prepared similarly to Example 1 except that 0.20 chemical equivalent of zinc oxide relative to the amount of the carboxyl group of polyacrylic acid was used.

Example 3

A coating solution (A) was prepared similarly to Example 2 except that polyacrylic acid (available from Polysciences Inc., Mn: 50,000, oxygen permeability coefficient: 50 cm$^3$ (STP)·μm/m$^2$·day·MPa) was used in place of the polyacrylic acid (Aron A-10H).

Comparative Example 1

A coating solution (A) for comparison was prepared similarly to Example 1 except that 0.30 chemical equivalent of zinc oxide relative to the amount of the carboxyl group of polyacrylic acid was used.

(ii) Evaluation of Coating Solution

The appearance of each resultant coating solution was visually observed. Then, the case where zinc oxide was dissolved in the coating solution and the appearance was transparent was determined to be "passed." The case where a part of zinc oxide was not dissolved and the zinc oxide deposited was determined to be "failed." The results obtained and the compositions of the coating solutions used in the Examples and Comparative Examples are listed in Table 1.

GAS BARRIER FILM

(i) Fabrication of Gas Barrier Film

Example 4

The coating solution (A) obtained in Example 2 was applied to a corona-treated side of a biaxially oriented polyester film (support) having a thickness of 12 μm using a mayer bar and the resulting material was dried at 90° C. for 30 seconds to obtain a gas barrier film comprising the layer (a) having a thickness of 0.3 μm formed from the coating solution (A).

Example 5

A gas barrier film was obtained similarly to Example 4 except that the coating solution (A) obtained in Example 3 was used in place of the coating solution (A) obtained in Example 2.

Comparative Example 2

First, 5 Parts by weight of polyacrylic acid (available from Toagosei Co., Ltd., Aron A-10H, Mn: 200,000, oxygen permeability coefficient: 50 cm$^3$ (STP)·μm/m$^2$·day·MPa) was diluted with 100 parts by weight of water to prepare a coating solution (A) for comparison. Then, a gas barrier film for comparison was obtained similarly to Example 4 except that the resulting coating solution (A) for comparison was used in place of the coating solution (A) obtained in Example 2.

Comparative Example 3

First, 5 parts by weight of polyacrylic acid (available from Toagosei Co., Ltd., Aron A-10H, Mn: 200,000, oxygen permeability coefficient: 50 cm$^3$ (STP)·μm/m$^2$·day·MPa) was diluted with 100 parts by weight of water. Thereafter, 0.03 chemical equivalent of zinc oxide relative to the amount of the carboxyl group of polyacrylic acid was added thereto and then the resulting material was agitated at room temperature for two days to prepare a coating solution (A) for comparison. Then, a gas barrier film for comparison was obtained simi-

TABLE 1

| | Composition of coating solution (A) | | | | | |
|---|---|---|---|---|---|---|
| | Carboxylic acids | Number average molecular weight of polycarboxylic acid | Parts by weight of polycarboxylic acid (*1) | Zinc compound | Chemical equivalent (*2) | Coating solution (A) Appearance of coating solution |
| Example 1 | Polyacrylic acid | 200,000 | 5 | Zinc oxide | 0.15 | Passed |
| Example 2 | Polyacrylic acid | 200,000 | 5 | Zinc oxide | 0.20 | Passed |
| Example 3 | Polyacrylic acid | 50,000 | 5 | Zinc oxide | 0.20 | Passed |
| Comparative Example 1 | Polyacrylic acid | 200,000 | 5 | Zinc oxide | 0.30 | Failed |

(*1): The parts by weight indicates a parts by weight of polycarboxylic acid relative to 100 parts by weight of water.
(*2): The chemical equivalent indicates a chemical equivalent of a zinc compound relative to the carboxyl group of polycarboxylic acid.

larly to Example 4 except that the resulting coating solution (A) for comparison was used in place of the coating solution (A) obtained in Example 2.

Comparative Example 4

First, 5 parts by weight of polyacrylic acid (available from Toagosei Co., Ltd., Aron A-10H, Mn: 200,000, oxygen permeability coefficient 50 cm$^3$ (STP)·μm/m$^2$·day·MPa) was diluted with 100 parts by weight of water. Thereafter, 0.03 chemical equivalent of sodium hydroxide relative to the amount of the carboxyl group of polyacrylic acid was added thereto and then the resulting material was agitated at room temperature for two days to prepare a coating solution (A) for comparison. Then, a gas barrier film for comparison was obtained similarly to Example 4 except that the resulting coating solution (A) for comparison was used in place of the coating solution (A) obtained in Example 2.

Comparative Example 5

First, 5 parts by weight of polyacrylic acid (available from Toagosei Co., Ltd., Aron A-10H, Mn: 200,000, oxygen permeability coefficient: 50 cm$^3$ (STP)·μm/m$^2$·day·MPa) was diluted with 100 parts by weight of water. Thereafter, 0.03 chemical equivalent of magnesium hydroxide relative to the amount of the carboxyl group of polyacrylic acid was added thereto and then the resulting material was agitated at room temperature for two days to prepare a coating solution (A) for comparison. Then, a gas barrier film for comparison was obtained similarly to Example 4 except that the resulting coating solution (A) for comparison was used in place of the coating solution (A) obtained in Example 2.

Comparative Example 6

First, 5 parts by weight of polyacrylic acid (available from Toagosei Co., Ltd., Aron A-10H, Mn: 200,000, oxygen permeability coefficient: 50 cm$^3$ (STP)·μm/m$^2$·day·MPa) was diluted with 100 parts by weight of water. Thereafter, 0.03 chemical equivalent of calcium hydroxide relative to the amount of the carboxyl group of polyacrylic acid was added thereto and then the resulting material was agitated at room temperature for two days to prepare a coating solution (A) for comparison. Then, a gas barrier film for comparison was obtained similarly to Example 4 except that the resulting coating solution (A) for comparison was used in place of the coating solution (A) obtained in Example 2.

Comparative Example 7

First, 5 parts by weight of polyacrylic acid (available from Nihon Junyaku Co., Ltd., Jurymer AC-10L, Mn: 25,000, oxygen permeability coefficient: 50 cm$^3$ (STP)·μm/m$^2$·day·MPa) was diluted with 100 parts by weight of water. Thereafter, 0.10 chemical equivalent of zinc oxide relative to the amount of the carboxyl group of polyacrylic acid was added thereto and then the resulting material was agitated at room temperature for two days to prepare the coating solution (A) for comparison. Then, a gas barrier film for comparison was obtained similarly to Example 4 except that the resulting coating solution (A) for comparison was used in place of the coating solution (A) obtained in Example 2.

(ii) Evaluation of Water Resistance of Gas Barrier Film

Each resultant gas barrier film was immersed in cold water at a temperature of 20° C. for one second. The material taken out was taken as a film sample and subjected to oxygen permeability measurement. The water resistance of the gas barrier film was evaluated on the basis of the measurement. In other words, the oxygen permeability of the film sample was measured using an oxygen permeation tester (OX-TRAN2/20: available from MOCON Inc.) at a temperature of 30° C. and a relative humidity (RH) of 0% on the both sides. Then, the case where the measurement of the resulting oxygen permeability was less than 50 cm$^3$ (STP)/m$^2$·day·MPa was determined to be "passed." The case where the measurement of the resulting oxygen permeability was 50 cm$^3$ (STP)/m$^2$·day·MPa or larger was determined to be "failed." The results obtained and the compositions of the coating solutions used in the Examples and Comparative Examples are listed in Table 2. In addition, the measurement result of the oxygen permeability of the biaxially oriented polyester film having a thickness of 12 μm is shown in Table 2 as Reference Example 1.

TABLE 2

| | | Composition of coating solution (A) | | | | Gas barrier film | |
|---|---|---|---|---|---|---|---|
| | Carboxylic acids | Number average molecular weight of polycarboxylic acid | Parts by weight of polycarboxylic acid (*3) | Metal compound | Chemical equivalent (*4) | Oxygen permeability at a temperature of 30° C. and 0% RH after immersion in cold water (cm$^3$ (STP)/m$^2$ · day · MPa) | Water resistance |
| Example 4 | Polyacrylic acid | 200,000 | 5 | Zinc oxide | 0.20 | 28 | Passed |
| Example 5 | Polyacrylic acid | 50,000 | 5 | Zinc oxide | 0.20 | 38 | Passed |
| Comparative Example 2 | Polyacrylic acid | 200,000 | 5 | — | — | 1800 | Failed |

TABLE 2-continued

| | Composition of coating solution (A) | | | | | Gas barrier film | |
| --- | --- | --- | --- | --- | --- | --- | --- |
| | Carboxylic acids | Number average molecular weight of polycarboxylic acid | Parts by weight of polycarboxylic acid (*3) | Metal compound | Chemical equivalent (*4) | Oxygen permeability at a temperature of 30° C. and 0% RH after immersion in cold water (cm$^3$ (STP)/m$^2$ · day · MPa) | Water resistance |
| Comparative Example 3 | Polyacrylic acid | 200,000 | 5 | Zinc oxide | 0.03 | 1750 | Failed |
| Comparative Example 4 | Polyacrylic acid | 200,000 | 5 | Sodium hydroxide | 0.03 | 1880 | Failed |
| Comparative Example 5 | Polyacrylic acid | 200,000 | 5 | Magnesium hydroxide | 0.03 | 1850 | Failed |
| Comparative Example 6 | Polyacrylic acid | 200,000 | 5 | Calcium hydroxide | 0.03 | 1610 | Failed |
| Comparative Example 7 | Polyacrylic acid | 25,000 | 5 | Zinc oxide | 0.10 | 1020 | Failed |
| Reference Example 1 | — | — | — | — | — | 2000 | — |

(*3): The parts by weight indicates a parts by weight of polycarboxylic acid relative to 100 parts by weight of water.
(*4): The chemical equivalent indicates a chemical equivalent of a metal compound relative to the carboxyl group of polycarboxylic acid.

As apparent from the results listed in Table 2, it is verified that a gas barrier film of the present invention has excellent water resistance.

GAS BARRIER LAMINATE (i) Fabrication of Gas Barrier Laminate

Example 6

First, the coating solution (A) obtained in Example 2 was applied to a corona-treated side of a biaxially oriented polyester film (support) having a thickness of 12 μm using a mayer bar and the resulting material was dried at a temperature of 90° C. for 30 seconds to form the layer (a) having a thickness of 0.3 μm formed from the coating solution (A). Next, the coating solution (B) produced by dispersing 10 parts by weight of zinc oxide particulates of an average particle diameter of 20 nm in 100 parts by weight of water was applied to the surface of the layer (a) using a mayer bar and the resulting material was dried at a temperature of 90° C. for 30 seconds to form the layer (B) having a thickness of 0.5 μm formed from the coating solution (B), thereby fabricating a gas barrier laminate.

Example 7

A gas barrier laminate was fabricated similarly to Example 6 except that the coating solution (A) obtained in Example 3 was used in place of the coating solution (A) obtained in Example 2.

Comparative Examples 8 to 13

Each gas barrier laminate for comparison was obtained similarly to Example 6 except that, in place of the coating solution (A) obtained in Example 2, the coating solution (A) used in Comparative Example 2 (Comparative Example 8), the coating solution (A) used in Comparative Example 3 (Comparative Example 9), the coating solution (A) used in Comparative Example 4 (Comparative Example 10), the coating solution (A) used in Comparative Example 5 (Comparative Example 11), the coating solution (A) used in Comparative Example 6 (Comparative Example 12), or the coating solution (A) used in Comparative Example 7 (Comparative Example 13) was used.

(ii) Measurement of Oxygen Permeability and Evaluation of Water Resistance

Each resultant gas barrier laminate was taken as a film sample and subjected to oxygen permeability measurement. In other words, the oxygen permeability of a film sample was measured at a temperature of 30° C. and a relative humidity of 0% (RH) on both sides using an oxygen permeation tester (OX-TRAN2/20; available from MOCON Inc.). The units are cm$^3$ (STP)/m$^2$·day·MPa. In addition, the appearance of a film sample was visually observed, and water resistance of a gas barrier laminate was evaluated. The case where a film sample had no whitening and no deteriorating of transparency was determined to be "passed." The case where a film sample had whitening or deteriorating of transparency due to the breakage of the film was determined to be "failed." The results obtained and the compositions of the coating solutions used in the Examples and Comparative Examples are listed in Table 3.

TABLE 3

| | Composition of coating solution (A) (*5) | | | Composition of coating solution (B) | | Gas barrier laminate | |
|---|---|---|---|---|---|---|---|
| | Number average molecular weight of polyacrylic acid | Metal compound | Chemical equivalent (*6) | Multivalent metal compound | Solvent | Oxygen permeability at a temperature of 30° C. and 0% RH (cm³ (STP)/m² · day · MPa) | Water resistance |
| Example 6 | 200,000 | Zinc oxide | 0.20 | Zinc oxide | Water | 16 | Passed |
| Example 7 | 50,000 | Zinc oxide | 0.20 | Zinc oxide | Water | 18 | Passed |
| Comparative Example 8 | 200,000 | — | — | Zinc oxide | Water | 900 | Failed |
| Comparative Example 9 | 200,000 | Zinc oxide | 0.03 | Zinc oxide | Water | 870 | Failed |
| Comparative Example 10 | 200,000 | Sodium hydroxide | 0.03 | Zinc oxide | Water | 920 | Failed |
| Comparative Example 11 | 200,000 | Magnesium hydroxide | 0.03 | Zinc oxide | Water | 910 | Failed |
| Comparative Example 12 | 200,000 | Calcium hydroxide | 0.03 | Zinc oxide | Water | 780 | Failed |
| Comparative Example 13 | 25,000 | Zinc oxide | 0.10 | Zinc oxide | Water | 680 | Failed |

(*5): The amount of polyacrylic acid in the coating solution (A) is 5 parts by weight relative to 100 parts by weight of water.
(*6): The chemical equivalent indicates a chemical equivalent of a metal compound relative to the carboxyl group of polyacrylic acid.

As apparent from the results listed in Table 3, it is verified that the present invention makes it possible to obtain a gas barrier laminate having excellent oxygen barrier properties and transparency even where water is used as a solvent for the coating solution (B).

(iii) Fabrication of Gas Barrier Laminate for Water Resistance Evaluation

Example 8

First, the coating solution (A) obtained in Example 2 was applied to a corona-treated side of a biaxially oriented polyester film (support) having a thickness of 12 μm using a mayer bar and the resulting material was dried at a temperature of 90° C. for 30 seconds to form the layer (a) having a thickness of 0.3 μm formed from the coating solution (A). Next, a zinc oxide particulate toluene dispersion liquid (available from Sumitomo Osaka Cement Co., Ltd., zinc oxide dispersion paint ZR133, solid concentration 33% by weight) was applied to the surface of above layer (a) using a mayer bar and the resulting material was dried at a temperature of 90° C. for 30 seconds to form the layer (b) of a thickness of 0.5 μm formed from the coating solution (B), thereby fabricating a gas barrier laminate.

Example 9

A gas barrier laminate was fabricated similarly to Example 8 with the except that the coating solution (A) obtained in Example 3 was used in place of the coating solution (A) obtained in Example 2.

Comparative Examples 14 to 19

Each gas barrier laminate for comparison was fabricated similarly to Example 8 except that, in place of the coating solution (A) obtained in Example 2, the coating solution (A) used in Comparative Example 2 (Comparative Example 14), the coating solution (A) used in Comparative Example 3 (Comparative Example 15), the coating solution (A) used in Comparative Example 4 (Comparative Example 16), the coating solution (A) used in Comparative Example 5 (Comparative Example 17), the coating solution (A) used in Comparative Example 6 (Comparative Example 18), or the coating solution (A) used in Comparative Example 7 (Comparative Example 19) was used.

(iv) Evaluation of Water Resistance of Gas Barrier Laminate

Each resultant gas barrier laminate was immersed in cold water at a temperature of 20° C. for three minutes and then used as a film sample. The film sample was subjected to evaluation or measurement of water resistance and oxygen permeability after immersion in cold water. In other words, the appearance of the film sample after immersed in cold water was visually observed, and the water resistance of the gas barrier laminate was evaluated. The case where a film sample exhibited no whitening and no deteriorating of transparency was determined to be "good" and the case where a film sample exhibited whitening was determined to be "whitened." In addition, the oxygen permeability of a film sample after immersed in cold water was measured by the same method as the above. The results obtained and the compositions of the coating solutions used in Examples and Comparative Examples are listed in Table 4.

TABLE 4

| | Composition of coating solution (A) (*7) | | | Composition of coating solution (B) | | Gas barrier laminate | |
| --- | --- | --- | --- | --- | --- | --- | --- |
| | Number average molecular weight of polyacrylic acid | Metal compound | Chemical equivalent (*8) | Multivalent metal compound | Solvent | Water resistance | Oxygen permeability at a temperature of 30° C. and 0% RH after immersion in cold water (cm$^3$ (STP)/m$^2$ · day · MPa) |
| Example 8 | 200,000 | Zinc oxide | 0.20 | Zinc oxide | Toluene | Good | 35 |
| Example 9 | 50,000 | Zinc oxide | 0.20 | Zinc oxide | Toluene | Good | 38 |
| Comparative Example 14 | 200,000 | — | — | Zinc oxide | Toluene | Whitened | 570 |
| Comparative Example 15 | 200,000 | Zinc oxide | 0.03 | Zinc oxide | Toluene | Whitened | 520 |
| Comparative Example 16 | 200,000 | Sodium hydroxide | 0.03 | Zinc oxide | Toluene | Whitened | 580 |
| Comparative Example 17 | 200,000 | Magnesium hydroxide | 0.03 | Zinc oxide | Toluene | Whitened | 590 |
| Comparative Example 18 | 200,000 | Calcium hydroxide | 0.03 | Zinc oxide | Toluene | Whitened | 520 |
| Comparative Example 19 | 25,000 | Zinc oxide | 0.10 | Zinc oxide | Toluene | Whitened | 450 |

(*7): The amount of polyacrylic acid in the coating solution (A) is 5 parts by weight relative to 100 parts by weight of water.
(*8): The chemical equivalent indicates a chemical equivalent of a metal compound relative to the carboxyl group of polyacrylic acid.

As apparent from the results listed in Table 4, it is verified that a gas barrier laminate of the present invention has excellent water resistance and excellent gas barrier properties even when exposed to cold water. Hence, it is verified that the present invention makes it possible to obtain a packaging material in which whitening can be sufficiently prevented, and also which is excellent in gas barrier properties and transparency, even when the packaging material is exposed to cold water of 30° C. or less.

GAS BARRIER MULTILAYER FILM (i) Fabrication of Gas Barrier Multilayer Film

Example 10

First, the coating solution (A) obtained in Example 2 was applied to a corona-treated side of a biaxially oriented polyester film (support) having a thickness of 12 μm using a mayer bar and the resulting material was dried at a temperature of 90° C. for 30 seconds to form the layer (a) having a thickness of 0.3 μm formed from the coating solution (A). Next, the coating solution (B) produced by dispersing 10 parts by weight of zinc oxide particulates of an average particle diameter of 20 nm in 100 parts by weight of water was applied to the surface of the layer (a) using a mayer bar and the resulting material was dried at a temperature of 90° C. for 30 seconds to form the layer (b) having a thickness of 0.5 μm formed from the coating solution (B), thereby fabricating a gas barrier laminate. Next, a urethane-based adhesive was applied to the surface of the layer (b) and then a polypropylene film having a thickness of 60 μm was laminated thereon to fabricate a gas barrier multilayer film.

Example 11

First, a urethane-based adhesive (available from MITSUI TAKEDA CHEMICALS, INC., Takelac A-620, and hardener: Takenate A-65) was applied to a corona-treated side of a biaxial oriented polyester film (support) having a thickness of 12 μm using a mayer bar so as to make the thickness 0.1 μm and the resulting material was dried at 90° C. for 30 seconds to form an anchor coat layer. Then, a gas barrier multilayer film was fabricated similarly to Example 10 except that the coating solution (A) was applied to the surface of the anchor coat layer.

Example 12

A gas barrier multilayer film was fabricated similarly to Example 10 except that the coating solution (A) obtained in Example 3 was used in place of the coating solution (A) obtained in Example 2.

Example 13

A gas barrier multilayer film was fabricated similarly to Example 10 except that a biaxially oriented polyamide film having a thickness of 15 μm was used in place of the biaxially oriented polyester film having a thickness of 12 μm.

Example 14

First, a urethane-based adhesive (available from MITSUI TAKEDA CHEMICALS, INC., Takelac A-620, and hardener: Takenate A-65) was applied to a corona-treated side of a biaxial oriented polypropylene film (support) having a thickness of 20 μm using a mayer bar so as to make the thickness 0.1 μm and the resulting material was dried at 90° C. for 30 seconds to form an anchor coat layer. Then, a gas barrier multilayer film was fabricated similarly to Example 10 except that the coating solution (A) was applied to the surface of the anchor coat layer.

Comparative Examples 20 to 25

Each gas barrier multilayer film for comparison was fabricated similarly to Example 10 except that, in place of the coating solution (A) obtained in Example 2, the coating solution (A) used in Comparative Example 2 (Comparative Example 20), the coating solution (A) used in Comparative Example 3 (Comparative Example 21), the coating solution (A) used in Comparative Example 4 (Comparative Example 22), the coating solution (A) used in Comparative Example 5 (Comparative Example 23), the coating solution (A) used in Comparative Example 6 (Comparative Example 24), or the coating solution (A) used in Comparative Example 7 (Comparative Example 25) was used.

(ii) Measurement of Oxygen Permeability and Evaluation of Water Resistance

Each resultant gas barrier multilayer film was taken as a film sample and subjected to oxygen permeability measurement. In other words, the oxygen permeability of a film sample was measured at a temperature of 30° C. and a relative humidity of 0% (RH) on both sides using an oxygen permeation tester (OX-TRAN2/20; available from MOCON Inc.). In addition, the units are $cm^3$ $(STP)/m^2 \cdot day \cdot MPa$. Additionally, the appearance of a film sample was visually observed, and water resistance of a gas barrier multilayer film was evaluated. The case where a film sample had no whitening and no deteriorating of transparency was determined to be "passed." The case where a film sample had whitening or deteriorating of transparency due to the breakage of the film was determined to be "failed." The results obtained and the compositions of the supports and the coating solution (A) used in the Examples and Comparative Examples are listed in Table 5.

(iii) Fabrication of Gas Barrier Multilayer Film

Example 15

First, the coating solution (A) obtained in Example 2 was applied to a corona-treated side of a biaxially oriented polyester film (support) having a thickness of 12 μm using a mayer bar and the resulting material was dried at a temperature of 90° C. for 30 seconds to form the layer (a) having a thickness of 0.3 μm formed from the coating solution (A). Next, a zinc oxide particulate toluene dispersion liquid (available from Sumitomo Osaka Cement Ltd., zinc oxide dispersion paint ZR133, solid concentration 33% by weight) was applied to the surface of the layer (a) using a mayer bar and the resulting material was dried at a temperature of 90° C. for 30 seconds to form the layer (b) having a thickness of 0.5 μm formed from the coating solution (B), thereby fabricating a gas barrier laminate. Next, a urethane-based adhesive was applied to the surface of the layer (b) and then a polypropylene film of a thickness having 60 μm was laminated thereon to fabricate a gas barrier multilayer film.

Example 16

First, a urethane-based adhesive (available from MITSUI TAKEDA CHEMICALS, INC., Takelac A-620, and hard-

TABLE 5

| | Composition of support | | Composition of coating solution (A) (*9) | | | Gas barrier multilayer film | |
|---|---|---|---|---|---|---|---|
| | Material | Anchor coat layer | Number average molecular weight of polyacrylic acid | Metal compound | Chemical equivalent (*10) | Oxygen permeability at a temperature 30° C. and 0% RH ($cm^3$ $(STP)/m^2 \cdot day \cdot MPa$) | Water resistance |
| Example 10 | Biaxially oriented polyester | None | 200,000 | Zinc oxide | 0.20 | 12 | Passed |
| Example 11 | Biaxially oriented polyester | Present | 200,000 | Zinc oxide | 0.20 | 8 | Passed |
| Example 12 | Biaxially oriented polyester | None | 50,000 | Zinc oxide | 0.20 | 15 | Passed |
| Example 13 | Biaxially oriented polyamide | None | 200,000 | Zinc oxide | 0.20 | 18 | Passed |
| Example 14 | Biaxially oriented polypropylene | Present | 200,000 | Zinc oxide | 0.20 | 22 | Passed |
| Comparative Example 20 | Biaxially oriented polyester | None | 200,000 | — | — | 1280 | Failed |
| Comparative Example 21 | Biaxially oriented polyester | None | 200,000 | Zinc oxide | 0.03 | 1210 | Failed |
| Comparative Example 22 | Biaxially oriented polyester | None | 200,000 | Sodium hydroxide | 0.03 | 1290 | Failed |
| Comparative Example 23 | Biaxially oriented polyester | None | 200,000 | Magnesium hydroxide | 0.03 | 1080 | Failed |
| Comparative Example 24 | Biaxially oriented polyester | None | 200,000 | Calcium hydroxide | 0.03 | 1110 | Failed |
| Comparative Example 25 | Biaxially oriented polyester | None | 25,000 | Zinc oxide | 0.10 | 890 | Failed |

(*9): The amount of polyacrylic acid in the coating solution (A) is 5 parts by weight relative to 100 parts by weight of water.
(*10): The chemical equivalent indicates a chemical equivalent of a metal compound relative to the carboxyl group of polyacrylic acid.

As apparent from the results listed in Table 5, it is verified that the present invention makes it possible to obtain a gas barrier multilayer film that has excellent oxygen barrier properties and transparency can be obtained even when water is used as a solvent for the coating solution (B).

ener: Takenate A-65) was applied to a corona-treated side of a biaxially oriented polyester film (support) having a thickness of 12 μm using a mayer bar so as to make the thickness 0.1 μm and the resulting material was dried at 90° C. for 30 seconds to form an anchor coat layer. Then, a gas barrier multilayer film was fabricated similarly to Example 15 except that the coating solution (A) was applied to the surface of the anchor coat layer.

Example 17

A gas barrier multilayer film was fabricated similarly to Example 15 except that the coating solution (A) obtained in Example 3 was used in place of the coating solution (A) obtained in Example 2.

Example 18

A gas barrier multilayer film was fabricated similarly to Example 15 except that a biaxially oriented polyamide film of a thickness having 15 μm was used in place of the biaxially oriented polyester film having a thickness of 12 μm.

Example 19

First, a urethane-based adhesive (available from MITSUI TAKEDA CHEMICALS, INC., Takelac A-620, and hardener: Takenate A-65) was applied a corona-treated side of a biaxially oriented polypropylene film (support) having a thickness of 20 μm using a mayer bar so as to make the thickness 0.1 μm and the resulting material was dried at a temperature of 90° C. for 30 seconds to form an anchor coat layer. Then, a gas barrier multilayer film was fabricated similarly to Example 15 except that the coating solution (A) was applied to the surface of the anchor coat layer.

Comparative Example 26 to 31

Each gas barrier multilayer film for comparison was fabricated similarly to Example 15 except that, in place of the coating solution (A) obtained in Example 2, the coating solution (A) used in Comparative Example 2 (Comparative Example 26), the coating solution (A) used in Comparative Example 3 (Comparative Example 27), the coating solution (A) used in Comparative Example 4 (Comparative Example 28), the coating solution (A) used in Comparative Example 5 (Comparative Example 29), the coating solution (A) used in Comparative Example 6 (Comparative Example 30), or the coating solution (A) used in Comparative Example 7 (Comparative Example 31) was used.

(iv) Measurement of Oxygen Permeability Under High Moisture Atmosphere

Each resultant gas barrier multilayer film was taken as a film sample and subjected to oxygen permeability measurement (temperature of 30° C. and humidity of 80% RH) in a high moisture atmosphere. In other words, the oxygen permeability of a film sample was measured at a temperature of 30° C. and a relative humidity of 80% (RH) on both sides using an oxygen permeation tester (OX-TRAN2/20; available from MOCON Inc.). In addition, the units are $Cm^3$ (STP)/$m^2$·day·MPa. The results obtained and the compositions of the supports and the coating solution (A) used in the Examples and Comparative Examples are listed in Table 6.

TABLE 6

|  | Composition of support | | Composition of coating solution (A) (*11) | | | Gas barrier multilayer film Oxygen permeability |
| --- | --- | --- | --- | --- | --- | --- |
|  | Material | Anchor coat layer | Number average molecular weight of polyacrylic acid | Metal compound | Chemical equivalent (*12) | at a temperature 30° C. and 80% RH ($cm^3$ (STP)/$m^2$ · day · MPa) |
| Example 15 | Biaxially oriented polyester | None | 200,000 | Zinc oxide | 0.20 | 29 |
| Example 16 | Biaxially oriented polyester | Present | 200,000 | Zinc oxide | 0.20 | 26 |
| Example 17 | Biaxially oriented polyester | None | 50,000 | Zinc oxide | 0.20 | 27 |
| Example 18 | Biaxially oriented polyamide | None | 200,000 | Zinc oxide | 0.20 | 32 |
| Example 19 | Biaxially oriented polypropylene | Present | 200,000 | Zinc oxide | 0.20 | 35 |
| Comparative Example 26 | Biaxially oriented polyester | None | 200,000 | — | — | 270 |
| Comparative Example 27 | Biaxially oriented polyester | None | 200,000 | Zinc oxide | 0.03 | 250 |
| Comparative Example 28 | Biaxially oriented polyester | None | 200,000 | Sodium hydroxide | 0.03 | 280 |
| Comparative Example 29 | Biaxially oriented polyester | None | 200,000 | Magnesium hydroxide | 0.03 | 280 |
| Comparative Example 30 | Biaxially oriented polyester | None | 200,000 | Calcium hydroxide | 0.03 | 260 |
| Comparative Example 31 | Biaxially oriented polyester | None | 25,000 | Zinc oxide | 0.10 | 220 |

(*11): The amount of polyacrylic acid in the coating solution (A) is 5 parts by weight relative to 100 parts by weight of water.
(*12): The chemical equivalent indicates a chemical equivalent of a metal compound relative to the carboxyl group of polyacrylic acid.

As apparent from the results indicated in Table 6, it is verified that a gas barrier multilayer film of the present invention has excellent oxygen barrier properties in a high moisture atmosphere even before crosslinking caused by the multivalent metal compound progresses, i.e., even before processing (sterilization), such as boiling, and retort sterilization, under high temperature hot water conditions is applied.

PACKAGE

Example 20

Polypropylene film sides of the gas barrier multilayer film obtained in Example 16 were heat sealed to each other with an impulse sealer to fabricate a three-side sealed pouch of a size 25 cm×15 cm. Thereafter, 200 g of water was filled into this pouch, which was air-tightly sealed to obtain a package.

Next, the resultant package was immersed in water of 20° C. for 24 hours and the appearance and the oxygen permeability of the package after immersion treatment were evaluated or measured. In other words, when the appearance of the package after immersion treatment was visually evaluated, the transparency of the package was good. In addition, a part of the package after immersion treatment to which heat was not applied by the impulse sealer was excised. The part was taken as a sample and its oxygen permeability was measured, with the oxygen permeability being 18 $cm^3$ (STP)/$m^2$·day·MPa. Additionally, the oxygen permeability was measured at a temperature of 30° C. and a relative humidity (RH) of 0% on the both sides using an oxygen permeation tester (available from MOCON Inc: OX-TRAN2/20).

Moreover, the resulting package was subjected to sterilization using an autoclave under a condition of a temperature of 120° C. and a pressured of 2.5 Kg/$cm^2$ for 30 minutes. The appearance and the oxygen permeability of the package after the sterilization was evaluated or measured by a method similar to the above method. As a result, the transparency of the package after the sterilization was good. Furthermore, the oxygen permeability of the sample that was excised from the package after the germicidal treatment was 10 $cm^3$ (STP)/$m^2$·day·MPa.

As apparent from the above results, it is verified that the present invention makes it possible to obtain a packaging material that is suitable for heat sterilization packaging applications without occurrence of whitening and deterioration of transparency even if a packaging material is exposed to cold water of 30° C. or less.

INDUSTRIAL APPLICABILITY

As described above, the present invention makes it possible to provide a coating solution for obtaining a packaging material in which whitening can be sufficiently prevented, and also which is excellent in gas barrier properties and transparency, even when the material is exposed to cold water of 30° C., for example, in the case where the packaging material is used for a heat sterilization packaging application or the like. The present invention also makes it possible to provide a gas barrier film, a gas barrier laminate, and a gas barrier multilayer film, using the coating solution, as well as their manufacturing methods.

Consequently, the present invention is useful as a technique related to packaging materials of foods, beverages, chemicals, medicines and precision metal components such as electronic components, which tend to degrade due to the effect of oxygen or the like, and packaging materials of articles that need processing (heat sterilization) such as boiling and retort sterilization, under high-temperature hot water conditions, and particularly useful as a technique related to a packaging material of heat sterilization packaging applications.

The invention claimed is:

1. A coating solution, consisting essentially of:
   a first solvent;
   0.1 to 30 parts by weight of a polycarboxylic acid-based polymer relative to 100 parts by weight of the solvent; and
   0.05 to 0.25 chemical equivalent of a zinc compound relative to an amount of carboxyl group in the polycarboxylic acid-based polymer, wherein a number average molecular weight of the polycarboxylic acid-based polymer is in a range of 40,000 to 10,000,000.

2. A gas barrier film comprising:
   a layer (a) formed from a coating solution (A), consisting essentially of:
   a first solvent;
   0.1 to 30 parts by weight of a polycarboxylic acid-based polymer relative to 100 parts by weight of the solvent; and
   0.05 to 0.25 chemical equivalent of a zinc compound relative to an amount of carboxyl group in the polycarboxylic acid-based polymer, and in which a number average molecular weight of the polycarboxylic acid-based polymer is in a range of 40,000 to 10,000, 000; and
   a support,
   the gas barrier film having the layer (a) formed from the coating solution (A) on at least one side of the support.

3. A gas barrier laminate, comprising:
   a layer (a) formed from a coating solution (A), consisting essentially of:
   a first solvent;
   0.1 to 30 parts by weight of a polycarboxylic acid-based polymer relative to 100 parts by weight of the solvent; and 0.05 to 0.25 chemical equivalent of a zinc compound relative to an amount of carboxyl group in the polycarboxylic acid-based polymer, in which a number average molecular weight of the polycarboxylic acid-based polymer is in a range of 40,000 to 10,000,000;
   a layer (b) formed from a coating solution (B) containing a multivalent metal compound and a second solvent; and
   a support,
   the gas barrier laminate having, on at least one side of the support, at least one lamination unit in which the layer (a) formed from the coating solution (A) and the layer (b) formed from the coating solution (B) are adjacent to each other.

4. A gas barrier multilayer film, comprising:
   the gas barrier laminate according to claim 3; and
   a plastic film laminated on at least one side of the gas barrier laminate.

5. A packaging material, comprising the gas barrier laminate according to claim 3.

6. A package, comprising the gas barrier laminate according to claim 3.

7. A method of manufacturing a gas barrier film, comprising:
   applying, to at least one side of a support, a coating solution (A), consisting essentially of:
   a first solvent;
   0.1 to 30 parts by weight of a polycarboxylic acid-based polymer relative to 100 parts by weight of the solvent; and
   0.05 to 0.25 chemical equivalent of a zinc compound relative to an amount of carboxyl group in the polycarboxylic acid-based polymer, and in which a number average molecular weight of the polycarboxylic acid-based polymer is in a range of 40,000 to 10,000, 000; and drying to obtain a gas barrier film that has the layer (a) formed from the coating solution (A).

8. A method of manufacturing a gas barrier laminate, comprising:

applying, to at least one side of a support, a coating solution (A), consisting essentially of:

a first solvent;

0.1 to 30 parts by weight of a polycarboxylic acid-based polymer relative to 100 parts by weight of the solvent; and 0.05 to 0.25 chemical equivalent of a zinc compound relative to an amount of carboxyl group in the polycarboxylic acid-based polymer, and in which a number average molecular weight of the polycarboxylic acid-based polymer is in a range of 40,000 to 10,000,000;

applying a coating solution (B) which contains a multivalent metal compound and a second solvent; and drying to obtain a gas barrier laminate having at least one lamination unit in which the layer (a) formed from the coating solution (A) and the layer (b) formed from the coating solution (B) are adjacent to each other.

9. A method of manufacturing a gas barrier multilayer comprising laminating a plastic film on at least one side of the barrier laminate by the method of claim 8 to obtain the gas barrier multilayer film.

* * * * *